US012564929B2

(12) United States Patent
Holzmeier et al.

(10) Patent No.: US 12,564,929 B2
(45) Date of Patent: Mar. 3, 2026

(54) POWER TOOL HAVING A FIRST GEAR STAGE AND A BELT DRIVE

(71) Applicant: Hilti Aktiengesellschaft, Schaan (LI)

(72) Inventors: Georg Holzmeier, Marktoffingen (DE); Thomas Reichenberger, Untermühlhausen (DE); Ralf Greitmann, Kaufering (DE)

(73) Assignee: Hilti Aktiengesellschaft, Schaan (LI)

(*) Notice: Subject to any disclaimer, the term of this patent is extended or adjusted under 35 U.S.C. 154(b) by 584 days.

(21) Appl. No.: 17/501,766

(22) Filed: Oct. 14, 2021

(65) Prior Publication Data

US 2023/0124887 A1 Apr. 20, 2023

(51) Int. Cl.
*B25F 5/00* (2006.01)

(52) U.S. Cl.
CPC .................................... *B25F 5/001* (2013.01)

(58) Field of Classification Search
CPC ....................................................... B25F 5/001
See application file for complete search history.

(56) References Cited

U.S. PATENT DOCUMENTS

2008/0277132 A1* 11/2008 Pesik ...................... B25F 5/001 173/213
2010/0216583 A1* 8/2010 Westelaken ............... F16G 5/20 474/238
2018/0193972 A1* 7/2018 Schadow ................ B25F 5/001
2018/0369939 A1 12/2018 Zimmerman et al.
2020/0246957 A1* 8/2020 Hanussek .............. B23D 45/16

FOREIGN PATENT DOCUMENTS

WO WO2020171766 A1 8/2020

* cited by examiner

*Primary Examiner* — Daniel Jeremy Leeds
(74) *Attorney, Agent, or Firm* — Davidson Kappel LLC

(57) ABSTRACT

A power tool includes a motor, a rotary disk, a belt drive connecting the motor to the rotary disk, and a reduction gear stage between the motor and the belt drive. A power tool with a ratio of an outer diameter of the drive pulley and an outer diameter of the output pulley being 0.75 to 1.33 is also provided as is a method of operating a power tool.

18 Claims, 2 Drawing Sheets

POWER TOOL HAVING A FIRST GEAR STAGE AND A BELT DRIVE

BACKGROUND OF THE INVENTION

The invention relates to power tools, in particular in the field of tools having rotary disks such as cut-off grinders and saws.

WO 2020 171 766 A1 discloses a handheld cut-off saw for cutting concrete and stone, the handheld cut-off saw comprising a drive arrangement for driving a circular cutting tool, the drive arrangement comprising: a belt drive portion comprising a first pulley and a second pulley, wherein the first pulley is arranged to be powered by a power source and to drive the second pulley via a belt, wherein the second pulley has a larger pitch diameter than the first pulley; and a gear transmission portion comprising a first gearwheel and a second gearwheel, wherein the first gearwheel is co-axially connected to the second pulley and radially connected to the second gearwheel, and wherein the second gearwheel is arranged to be co-axially connected to the circular cutting tool.

SUMMARY OF THE INVENTION

The provision of the pulleys with different sizes disadvantageously results in a large amount of flexing within the belt. This flexing, caused in particular by pulleys with small diameters, can result in rapid wearing of the belt of the belt drive. As a result, transmission of rotational movement from the motor of the cut-off grinder to the cut-off wheel is impaired and efficiency of transmission is reduced. Moreover, power losses and friction losses can occur at the belt, and these can result in an undesired increase in temperature at the belt, in which case heat has to be dissipated from the region of the belt drive by frequently-complicated cooling equipment. This arrangement impairs the provision of compact, manageable machines, since cooling equipment frequently has a significant volume requirement.

Since the movement of the motor in conventional grinders is generally characterized by very high rotational speeds, the belt drive is therefore also made to move with a high belt speed, and this can in turn intensify the increase in temperature, and increase the power loss and friction loss.

The cut-off grinder described in WO 2020 171 766 A1 has many of the known drawbacks, such as an increase in temperature, power loss and friction.

An object of the present invention is to overcome the above-described defects and drawbacks of the prior art and to provide a power tool with which flexing in the belt of a belt drive can be reduced in order to reduce or avoid undesired heating of the belt by friction and undesired losses upon transmission of the movement. An alternate or additional object of the invention is to provide a power tool with a particularly effective and efficient transmission of the movement of a motor of the power tool to a rotary disk.

The present invention provides a power tool comprising a motor; a rotary disk; a belt drive connecting the motor to the rotary disk; and a reduction gear stage between the motor and the belt drive.

By having a reduction gear stage as per the present invention, a belt drive with reduced belt wear and losses is possible. The present invention also allows for effective and efficient transmission of the motor to the tool. The reduction gear stage thus advantageously can reduce a high rotational speed of the motor and at the same time to increase the torque at its output. Advantageously, the gear stage can convert the high rotational speed that is generated by the motor of the power tool into a high torque.

Preferably, an intermediate shaft is present between the gear stage and the belt drive and connects the gear stage to the belt drive.

As a result of the reduction gear stage being arranged between the motor and the belt drive, and the cooperation of the transmission elements or gearwheels of the first gear stage with the intermediate shaft and the belt drive, a power tool can be provided in which an optimum motor design can be provided. This is achieved in particular by the flexible configuration of the reduction in the gear stage. Furthermore, the arrangement of the gear stage close to the center of gravity of the machine results in an ergonomically particularly favorable power tool with which a user can work in a sustained manner under a particularly low load.

The belt drive may comprise a first pulley configured as a drive pulley and a second pulley configured as an output pulley, wherein a belt passes around the pulleys. By way of the belt of the belt drive, a driveshaft for the rotary disk of the power tool can preferably be driven.

It is preferred that an outer diameter over which the belt runs of the drive pulley and of the output pulley lies in a range from 10 to 100 mm, preferably in a range from 20 to 75 mm, particularly preferably in a range from 25 to 50 mm, and most preferably in a range from 30 to 35 mm. As a result of the comparatively large pulleys of the belt drive of the proposed power tool and in particular as a result of the pulleys of the belt drive that have an approximately identical or similar size, the flexing of the belt as it is deflected around the pulleys can advantageously be reduced and in this way the lifetime thereof extended considerably. In particular pulleys having a diameter of between 30 and 35 mm have proven to be a good compromise between a long belt lifetime and a desired cutting depth of the rotary disk of the proposed power tool. In one exemplary embodiment of the invention, in which the power tool is configured as a cut-off grinder with a cut-off wheel, the diameters of the pulleys can be for example identical and measure 31 mm. As a result of the use of pulleys of substantially identical size, the invention differs from the prior art, since, for example, it is known practice, in the field of gasoline saws, to deliberately use pulleys of different sizes. The use of pulleys with a diameter of 30 to 35 mm advantageously makes it possible for surprisingly large cutting depths to be able to be allowed with the proposed power tool.

As a result of the size of the pulleys, in particular a particularly long belt lifetime can be achieved. This means that advantageously a power tool having particularly long-lasting belts can be provided. Furthermore, comparatively low belt temperatures are measured and comparatively low belt speeds are achieved at the belt drive of the proposed power tool, thereby further extending the lifetime of the belt of the proposed power tool.

It is preferred that the two pulleys of the belt drive have a substantially similar or identical diameter, i.e. are configured with a substantially similar or identical size. The pulleys of similar size preferably have the result that a larger share of the reduction effect of the first gear stage and of the belt drive is realized or takes place in the first gear stage. The wording "substantially similar or identical" is not an unclear expression to a person skilled in the art. A person skilled in the art will understand from the wording that, in the context of the present invention, pulleys with similar or identical diameters are intended to be used, wherein the diameters—for example for design- or production-related reasons—can differ slightly from one another. Here, in the context of the present invention, diameters that differ from one another from a ratio of 0.95 to 1.05 are considered to be "substantially identical or similar". However, a ratio of 0.75 to 1.33 may provide some substantial flexing wear advantages and a ratio of 0.9 to 1.11 is preferable.

The belt of the belt drive preferably may be configured as a V-ribbed belt, Preferably, the V-ribbed belt has a set of ribs, wherein the ribs extend preferably in the longitudinal direction of the belt. The use of a V-ribbed belt is associated, in the context of the present invention, with the advantage that such belts can slip on the pulleys if the rotary disk of the power tool seizes, without the ribs being damaged thereby, this not being the case when toothed belts are used. Thus, by way of the V-ribbed belt, the function of a slip clutch in the power tool can advantageously also be provided.

It is preferred that the belt of the belt drive has 5 to 15 ribs, preferably 8 to 12 ribs, and particularly preferably 10 ribs. Preferably, the number of ribs can be chosen depending on the particular requirements in the power tool. Use tests have shown that especially a number of 10 ribs contributes to a particularly stable and long-lasting belt. Furthermore, the belt of the belt drive can have a PJ profile. Other profiles, such as PH, PK, PL or PM, are also conceivable, however.

The belt of the belt drive according to the invention may lose only a little of its initial tension over its lifetime. In other words, it is preferred according to the invention that the belt of the belt drive substantially retains its original tension over its lifetime. This can be achieved in particular through a suitable choice of the material of which the belt consists. The material of which the belt consists can comprise for example a rubber-based base material. In order to increase the tensile strength of the belt, tension cords can be integrated into the belt, these comprising for example polyester, polyamide and/or aramid.

As a result, the flexing work of the belt can be reduced further and its lifetime further increased. Furthermore, as a result of the choice of a belt that remains substantially stable and retains its tension, it is possible to dispense with the use of additional belt tensioners. Also, as a result of the choice of a belt that remains substantially stable and retains its tension, it is possible to provide a particularly low-maintenance power tool since it does not require regular belt servicing in order to readjust the belt tension. In particular, this advantageously allows a belt design without belt tensioners and readjustment of the belt tension over the entire belt running time.

It is preferred that the drive pulley of the belt drive can be arranged on the intermediate shaft. The second gear wheel of the first gear stage advantageously can also be arranged on this shaft.

It is preferred that a rotational speed of the motor of the power tool be in a range from 10,000 rpm to 30,000 rpm, preferably in a range from 12,000 rpm to 26,000 rpm. These comparatively high motor speeds can result in low torque, and vice versa, and so, with the invention, a power tool can be provided in which the comparatively high numbers of revolutions of the motor of the proposed power tool can be reduced in order to provide a higher torque for the rotary disk of the power tool. In other words, the first gear stage of the proposed power tool is set up to convert the number of revolutions generated by the motor of the proposed power tool such that the motor speed is reduced and a higher torque can be provided for the rotary disk of the power tool.

According to the invention, it is preferred that a reduction ratio of the first gear stage is between 2 and 4. In one exemplary embodiment of the invention, in which the power tool is configured as a cut-off grinder with a cut-off wheel, the reduction ratio can be for example 3.25. The abovementioned reduction ratios result preferably in the desired conversion of the movement of the motor of the proposed power tool such that the high numbers of revolutions thereof can be reduced and the torque increased.

It also is preferred that the reduction gear stage is configured as spur gearing, in which spur gears, as they are known, are present preferably on substantially parallel axes.

According to the invention, it thus is preferred that the gearwheels or transmission elements of the reduction gear stage have teeth, which are configured as spur teeth. As a result, a direction of rotation of the motor of the power tool can advantageously be reversed. In other words, the spur teeth of the gearwheels of the first gear stage can allow a reversal in the direction of rotation of the motor of the power tool.

In an alternative configuration of the invention, the teeth of the gearwheels of the first gear stage can also be configured as helical teeth. As a result, particularly smooth running of the gearing can advantageously be allowed. Furthermore, use tests have shown that helical teeth of the gearwheels allow the provision of a particularly loadable gear stage, i.e. the resulting gearing withstands surprisingly high loads.

A diameter of the rotary disk of the power tool preferably is in the region of 300 mm. Thus, the proposed power tool has a rotary disk with a comparatively large diameter. With such a rotary disk, a power tool can be provided with which rapid work progress can be achieved, such that long cutting lengths per unit time can be achieved.

A circumferential speed of the rotary disk of the power tool preferably is in a range of no more than 80 m/s. A rotational speed of the rotary disk of the power tool is preferably in a range of no more than 5080 rpm.

It is preferred that a ratio of the diameter of the output pulley of the belt drive to the diameter of the rotary disk of the power tool is in a range from 1/30 to 1/3, preferably in a range from 2/30 to 1/4, particularly preferably in a range from 1/12 to 1/6, and most preferably in a range from 1/10 to 7/60. Tests have shown that, as a result of these ratios between the diameters of the output pulley and of the rotary disk, particularly good transmission of the movement of the belt drive to the rotary disk can be achieved. In this case, the movement is first of all transmitted from the belt drive, in particular the second pulley thereof, to the driveshaft of the rotary disk of the power tool, and from there to the rotary disk.

It is preferred that a ratio of the rotational speed of the motor of the power tool to a maximum rotational speed of the rotary disk of the power tool is in a range from 1.97 to 5.91, preferably in a range from 2.36 to 5.12. The inventors have found that, with such a ratio of motor speed to maximum rotational speed of the rotary disk, a particularly good and efficient conversion of the motor movement by a gear stage can be achieved, in particular when the first gear stage is arranged between the motor and the belt drive of the power tool. Advantageously, the movement of the motor of the proposed power tool can be transmitted with surprisingly high efficiency to the belt drive and thus to the rotary disk when the ratio between the motor speed and maximum rotational speed of the rotary disk is in a range from 2.36 to 5.12.

The drive of the power tool can be configured for example as an electric motor or as a combustion engine. In the field of electric motors, a line-powered and/or battery-powered motor, a universal motor or a brushless motor can be provided. In a particularly preferred exemplary embodiment of the invention, the power tool is an electric cut-off grinder having a brushless motor, wherein the electric power for operating the cut-off grinder is provided for example by two rechargeable batteries.

The present invention also provides a power tool comprising: a motor; a rotary disk; and a belt drive including a drive pulley driven by the motor, an output pulley connected to the rotary disk and a belt passing around the drive and output pulleys, a ratio of an outer diameter of the drive pulley and an outer diameter of the output pulley being 0.75 to 1.33.

As discussed above, having similar diameter pulleys advantageously can reduce belt flexing and wear.

The present invention also provides a power tool comprising: a motor; a rotary disk; and a belt drive including a drive pulley driven by the motor, an output pulley connected to the rotary disk and a belt passing around the drive and output pulleys, an outer diameter of each of the drive pulley and an outer diameter of the output pulley being between 25 to 50 mm.

The present invention also provide a method for operating a power tool having a motor, a rotary disk, and a belt drive including a drive pulley driven by the motor, an output pulley connected to the rotary disk and a belt passing around the drive and output pulleys, the method comprising: operating the motor at a speed between 10,000 rpm to 30,000 rpm; reducing the motor speed during the operating with a gear stage to drive the drive pulley at a speed less than 10,000 rpm; and driving the rotary disk with the output pulley at less than 10,000 rpm.

Further advantages will become apparent from the following description of the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs.

In the figures.

DETAILED DESCRIPTION

Figure 1:
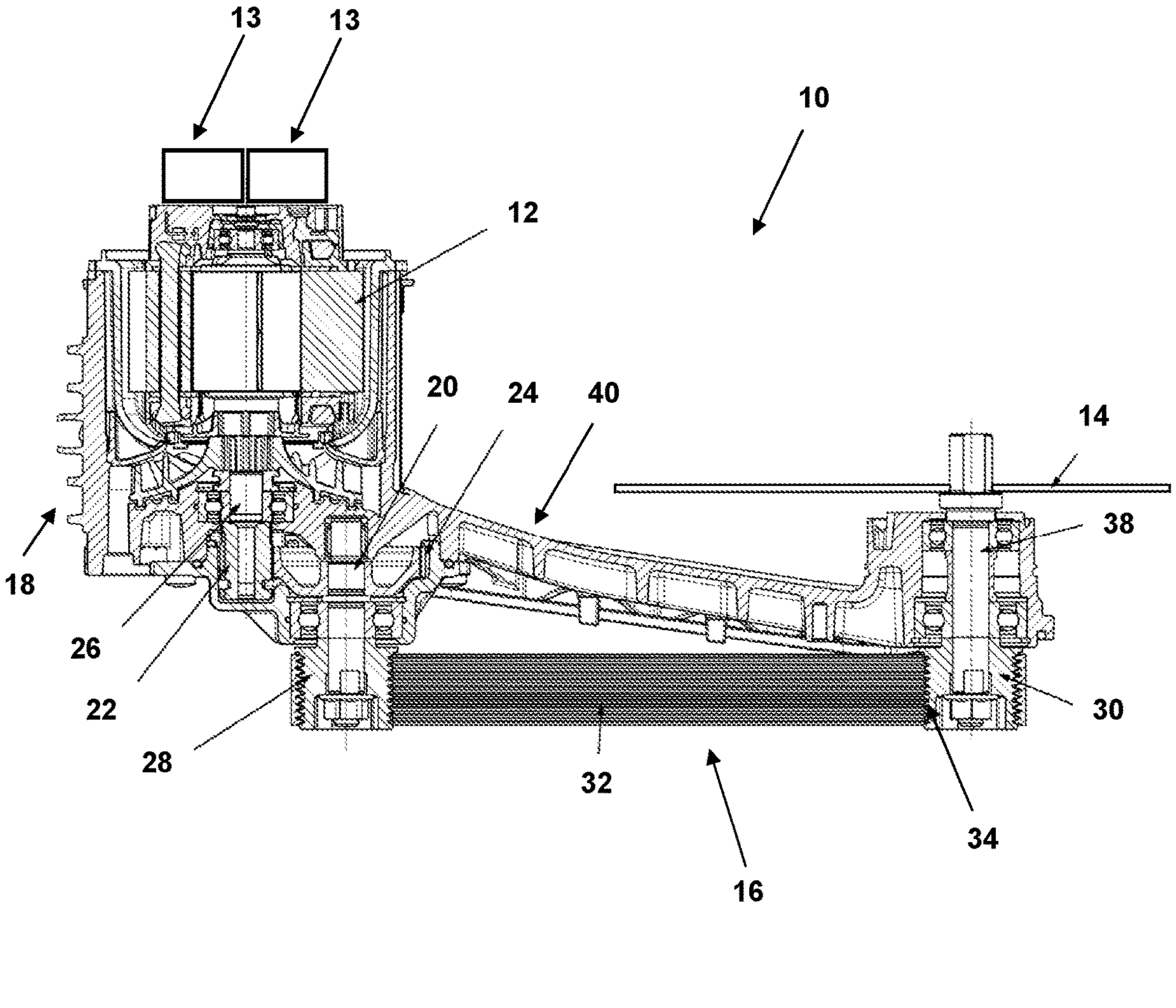
FIG. 1 shows a plan view of a preferred embodiment of the power tool of the present invention.

FIG. 1 shows a plan view of individual components of a preferred embodiment of a power tool 10 according to the present invention. In particular, power tool 10 has a reduction gear stage 18 and a belt drive 16, wherein reduction gear stage 18 and belt drive 16 are connected functionally together via an intermediate shaft 20. Power tool 10 has a motor 12, wherein a rotary movement of the motor 12 is transmitted to the first gear stage 18 via an output shaft 26 of the motor 12. Motor 12 preferably is a brushless electric motor driven rechargeable by two batteries 13, shown schematically. Reduction gear stage 18 has a first gear 22 and a second gear 24, configured as gearwheels. In this case, gear 22 has preferably a smaller diameter than second gear 24, in order to ensure a suitable reduction between the motor 12 and the belt drive 26. Gears 22, 24 have teeth 36, which can be configured in a straight manner in a preferred configuration of the invention; in other words, the first gear stage 18 can be configured with spur teeth. As a result, a direction of rotation of the motor 12 or the movement in the first gear stage 18 can be reversed particularly easily. The first gear stage 18 can be configured in particular as spur gearing.

Movement of motor 12 of power tool 10 is transmitted to the belt drive 16 via the first gear stage 18. This is achieved advantageously in that the first gear 22 of gear stage 18 is arranged on output shaft 26 of the motor 12 and thus picks up a movement of the motor 12. Second gear 24 of gear stage 18 engages first gear 22 and picks up the rotary movement of first gear 22. Second gear 24 of gear stage 18 is arranged on intermediate shaft 20, such that the intermediate shaft 20 is driven by movement of second gear 24 of gear stage 18. A first pulley 28 is also arranged on intermediate shaft 20. Pulley 28 is the drive pulley of the belt drive 16. Drive pulley 28 of the belt drive 16 is connected to a second pulley 30 of the belt drive 16 via a belt 32. According to the embodiment, pulley 28 and pulley have substantially identical or similar diameters, such that reduction work in the power tool 10 is carried out substantially in reduction gear stage 18.

Belt 32 of belt drive 16 is configured as a V-ribbed belt and has ribs 34. Preferably, the belt 32 has ten ribs 34 and a PJ profile. Second pulley 30 of the power tool 10 is present on a driveshaft 38 for rotary disk 14 of the power tool 10. Rotary disk 14 can preferably be a cut-off wheel, which has for example a diameter in the region of 300 mm. Other diameters of rotary disk 14 are also conceivable, however. Driveshaft 38 for rotary disk 14 is driven by second pulley 30, wherein rotary movement of driveshaft 38 is transmitted to rotary disk 14. The belt drive 16 is present in this embodiment in the region of a cutting arm 40 of the power tool 10, wherein the rotary disk 14 is arranged on the cutting arm 40. Cutting arm 40 connects preferably a main body of the power tool 10 to rotary disk 14.

Figure 2:
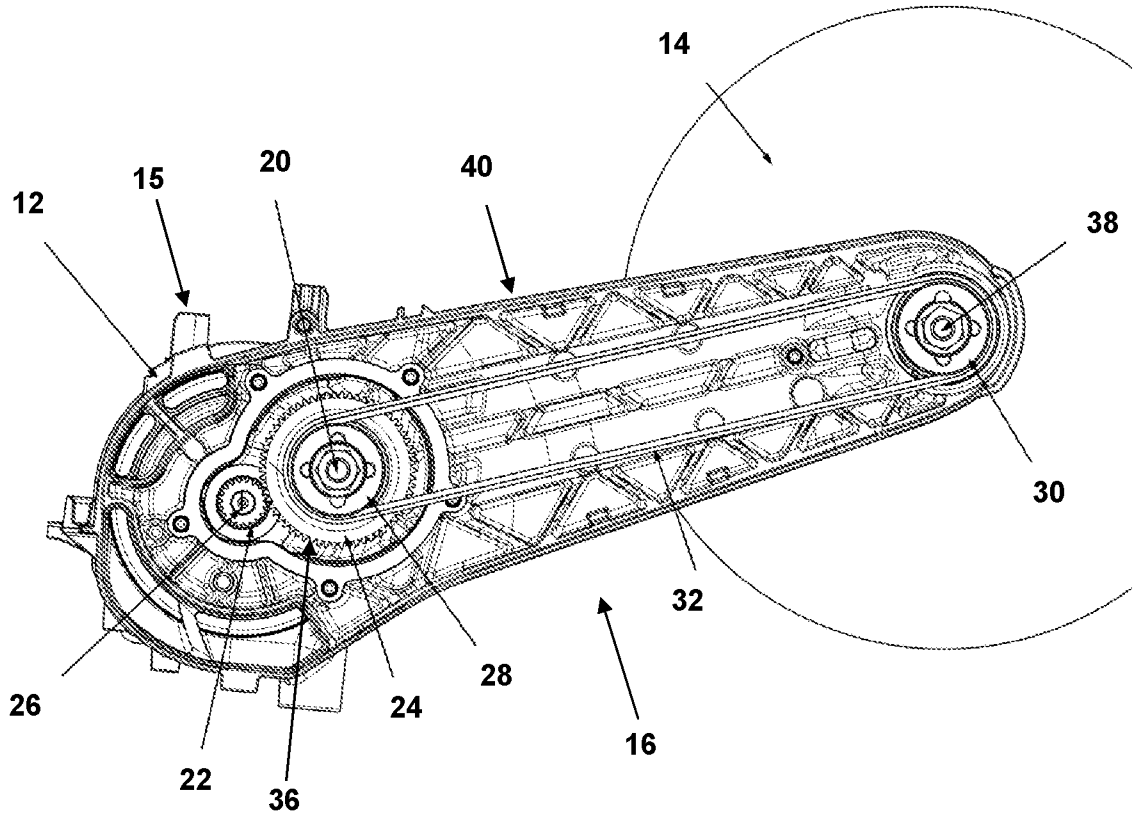
FIG. 2 shows a sectional illustration of the preferred embodiment of the power tool of the present invention.

FIG. 2 shows a sectional illustration of the preferred embodiment of power tool 10. In particular, FIG. 2 shows a section through the cutting arm 40 of the power tool 10. Illustrated on the left-hand side of FIG. 2 are the motor 12 and the first gear stage 18 of the proposed power tool 10. A rotary movement of the motor 12 can be transmitted to gear 22 of gear stage 18 by an output shaft 26. This is achieved in that gear 22 is arranged on the output shaft 26 such that gear 22 is made to move in rotation by rotation of motor output shaft 26. Second gear 24 of the first gear stage 18 engages first gear 22 and picks up the movement of the first gear 22. Gears 22, 24 are configured preferably as gearwheels of different sizes. Gears 22, 24 have teeth 36, which, in this embodiment, are configured in a straight manner in order to allow the direction of rotation to be reversed.

As a result of the movement of second gear 24, intermediate shaft 20 is driven, which for its part is connected to first pulley 28 of belt drive 16. First pulley 28 is driven by the intermediate shaft 20 and made to move in rotation. This rotary movement of first pulley 28 of belt drive 16 is transmitted to second pulley 30 by belt 32. The belt 32 can preferably be a V-ribbed belt with for example ten ribs 34, shown in FIG. 1. The rotation of output pulley 30 30 is transmitted to rotary disk 14 of the power tool 10 via a driveshaft 38.

Tool 10 can be a handheld and thus a handle 15, shown schematically, is also provided.

LIST OF REFERENCE SIGNS

10 Power tool
12 Motor
13 Batteries
14 Rotary disk

15 Handle
16 Belt drive
18 Gear stage
20 Intermediate shaft
22 First gear
24 Second gear
26 Output shaft
28 Drive pulley of the belt drive
30 Output of the belt drive
32 Belt
34 Ribs
36 Teeth of the gearwheels
38 Driveshaft for the rotary disk
40 Cutting arm

What is claimed is:

1. A power tool comprising:
- a motor;
- a rotary disk; and
- a belt drive including a drive pulley driven by the motor, an output pulley connected to the rotary disk and a belt passing around the drive and output pulleys, a ratio of an outer diameter of the drive pulley and an outer diameter of the output pulley being 0.75 to 1.33.

2. The power tool as recited in claim 1 further comprising:
- a reduction gear stage between the motor and the belt drive.

3. The power tool as recited in claim 2 further comprising an intermediate shaft between the reduction gear stage and the belt drive and connecting the reduction gear stage to the belt drive.

4. The power tool as recited in claim 2 wherein the motor has an output shaft and the reduction gear stage has a first gear and a second gear, the first gear being arranged on the output shaft of the motor and the second gear being arranged on the intermediate shaft.

5. The power tool as recited in claim 2 wherein the drive and output pulleys have an outer diameter of 10 to 100 mm.

6. The power tool as recited in claim 5 wherein the outer diameter is 25 to 50 mm.

7. The power tool as recited in claim 2 wherein the belt is a V-ribbed belt.

8. The power tool as recited in claim 7 wherein the V-ribbed belt has five to fifteen ribs.

9. The powertool as recited in claim 2 the drive pulley is arranged on the intermediate shaft.

10. The power tool as recited in claim 9 wherein the motor has an output shaft and the reduction gear stage has a first gear and a second gear, the first gear being arranged on the output shaft of the motor and the second gear being arranged on the intermediate shaft.

11. The power tool as recited in claim 2 wherein the motor is rated to have an operational rotational speed in a range from 10 000 rpm to 30 000 rpm.

12. The power tool as recited in claim 2 wherein a speed reduction ratio of the reduction gear stage is between 2 and 4.

13. The power tool as recited in claim 2 wherein a ratio between an outer diameter of the output pulley and an outer diameter of the rotary disk is in a range from 1/30 to 1/3.

14. The power tool as recited in claim 2 wherein a ratio between a rated operational rotational speed of the motor and a maximum rotational speed of the rotary disk is in a range from 1.97 to 5.91.

15. The power tool as recited in claim 2 wherein the rotary disk is a grinding wheel or saw.

16. The power tool as recited in claim 2 further comprising a handle, the power tool being a handheld power tool.

17. The power tool as recited in claim 2 wherein the motor is an electric motor and further comprising a rechargeable battery for driving the electric motor.

18. A method for operating a power tool having a motor, a rotary disk, and a belt drive including a drive pulley driven by the motor, an output pulley connected to the rotary disk and a belt passing around the drive and output pulleys, a ratio of an outer diameter of the drive pulley and an outer diameter of the output pulley being 0.75 to 1.33, the method comprising:
- operating the motor at a speed between 10,000 rpm to 30,000 rpm;
- reducing the motor speed during the operating with a gear stage to drive the drive pulley at a speed less than 10,000 rpm; and
- driving the rotary disk with the output pulley at less than 10,000 rpm.

* * * * *